US008209526B2

(12) United States Patent
Pierce et al.

(10) Patent No.: US 8,209,526 B2
(45) Date of Patent: Jun. 26, 2012

(54) METHOD AND SYSTEMS FOR RESTARTING A FLIGHT CONTROL SYSTEM

(75) Inventors: David Barnard Pierce, Kentwood, MI (US); Justin Jansen, Hudsonville, MI (US)

(73) Assignee: General Electric Company, Schenectady, NY (US)

( * ) Notice: Subject to any disclaimer, the term of this patent is extended or adjusted under 35 U.S.C. 154(b) by 881 days.

(21) Appl. No.: 12/242,357

(22) Filed: Sep. 30, 2008

(65) Prior Publication Data

US 2010/0083038 A1 Apr. 1, 2010

(51) Int. Cl.
*G06F 15/177* (2006.01)
*G06F 11/00* (2006.01)
(52) U.S. Cl. .............. 713/1; 714/6.1; 714/6.11
(58) Field of Classification Search ......... 714/6.11, 714/6.1; 713/1
See application file for complete search history.

(56) References Cited

U.S. PATENT DOCUMENTS

| 3,924,245 | A | * | 12/1975 | Eaton et al. ............. 711/219 |
| 4,622,667 | A | | 11/1986 | Yount |
| 5,109,521 | A | * | 4/1992 | Culley ................. 711/165 |
| 5,313,625 | A | | 5/1994 | Hess et al. |
| 5,363,502 | A | | 11/1994 | Kagimasa et al. |
| 6,195,695 | B1 | | 2/2001 | Cheston et al. |
| 6,665,813 | B1 | | 12/2003 | Forsman et al. |
| 6,804,752 | B2 | | 10/2004 | Patterson et al. |
| 6,970,890 | B1 | | 11/2005 | Bruce et al. |
| 2003/0033553 | A1 | * | 2/2003 | Liu ....................... 714/1 |
| 2004/0098140 | A1 | | 5/2004 | Hess |
| 2005/0132121 | A1 | | 6/2005 | Robinson |
| 2007/0186070 | A1 | * | 8/2007 | Federa et al. ............. 711/163 |
| 2009/0054045 | A1 | * | 2/2009 | Zakrzewski et al. ........ 455/418 |

FOREIGN PATENT DOCUMENTS

| WO | 02073505 A1 | 9/2002 |
| WO | 2007005790 A2 | 1/2007 |

OTHER PUBLICATIONS

European Search Report, dated Dec. 17, 2009, from the European Patent Office for co-pending European Patent Application No. 09171333.9 (6 pages).

* cited by examiner

*Primary Examiner* — Chun Cao
*Assistant Examiner* — Terrell Johnson
(74) *Attorney, Agent, or Firm* — David J. Clement, Esq.; Armstrong Teasdale LLP

(57) ABSTRACT

A method for rapid restarting of a flight control system, wherein the flight control system comprises a processor, is provided. The method includes storing at least one executable program on a memory device and copying the at least one executable program to a first random access memory (RAM) sector and a second RAM sector of a RAM memory device at a predetermined time. The method also includes copying the at least one executable program from the second RAM sector to the first RAM sector upon a restart of the processor and reinitializing processor operation by executing the at least one executable program copied from the second RAM sector to the first RAM sector.

19 Claims, 5 Drawing Sheets

METHOD AND SYSTEMS FOR RESTARTING A FLIGHT CONTROL SYSTEM

BACKGROUND OF THE INVENTION

The field of the invention relates generally to flight control systems, and more specifically, to a method and systems for rapid recovery after a flight control system error or fault.

At least some known aircraft include a control system that includes a digital computer. A flight control system receives inputs from sensors and/or a pilot and in response provides control signals to flight control components of the aircraft. An example of a flight control system included in some known aircraft is a fly-by wire system. In an aircraft that includes a fly-by wire system, a pilot's movements of cockpit controls are not transferred to a corresponding flight control surface of the aircraft through a mechanical coupling, such as hydraulics or cables. But rather, the pilot's movements of cockpit controls are converted by sensors into electronic signals that are transferred to the flight control system computer. The flight control system computer provides actuators coupled to the flight control surfaces of the aircraft with operating instructions. Fly-by wire systems also typically include sensors that provide the flight control system computer with data that is combined with the pilot inputs to determine operation of the flight control surfaces, for example an electronic stability system.

A flight control system may also be included in an unmanned vehicle. A flight control system in an unmanned aircraft receives electronic signals, for example from a remote location or from a pre-programmed flight-plan, and combines those electronic signals with information from sensors to determine operation of the flight control surfaces.

Uninterrupted operation of the computer and/or rapid recovery from a computer error or fault facilitates reliance on a computer for flight control.

BRIEF DESCRIPTION OF THE INVENTION

In one aspect, a method for rapid restarting of a flight control system, wherein the flight control system comprises a processor, is described. The method includes storing at least one executable program on a memory device and copying the at least one executable program to a first random access memory (RAM) sector and a second RAM sector of a RAM memory device at a predetermined time. The method also includes copying the at least one executable program from the second RAM sector to the first RAM sector upon a restart of the processor and reinitializing processor operation by executing the at least one executable program copied from the second RAM sector to the first RAM sector.

In another aspect, a flight control system is described. The flight control system includes at least one sensor/input device configured to collect data and a flight controller coupled to the at least one sensor/input device. The flight controller includes a random access memory (RAM) device configured to store at least one executable program in a first RAM sector and a second RAM sector and a processor configured to execute the at least one executable program from the first RAM sector to process the sensor/input device data, and to output operational instructions. The flight control system also includes at least one actuator coupled to the flight controller. The actuator is configured to receive and execute the operational instructions.

In yet another aspect, a flight controller is described. The flight controller includes a random access memory (RAM) device including a first RAM sector and a second RAM sector, wherein a first copy of at least one executable program is stored in the first RAM sector and a second copy of the at least one executable program is stored in the second RAM sector. The flight controller also includes a processor configured to execute the at least one executable program from the first RAM sector.

DETAILED DESCRIPTION OF THE INVENTION

The following detailed description illustrates embodiments of the invention by way of example and not by way of limitation. It is contemplated that the invention has general application to rapid restarting of a plant control system that reduces interruptions to plant operation in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
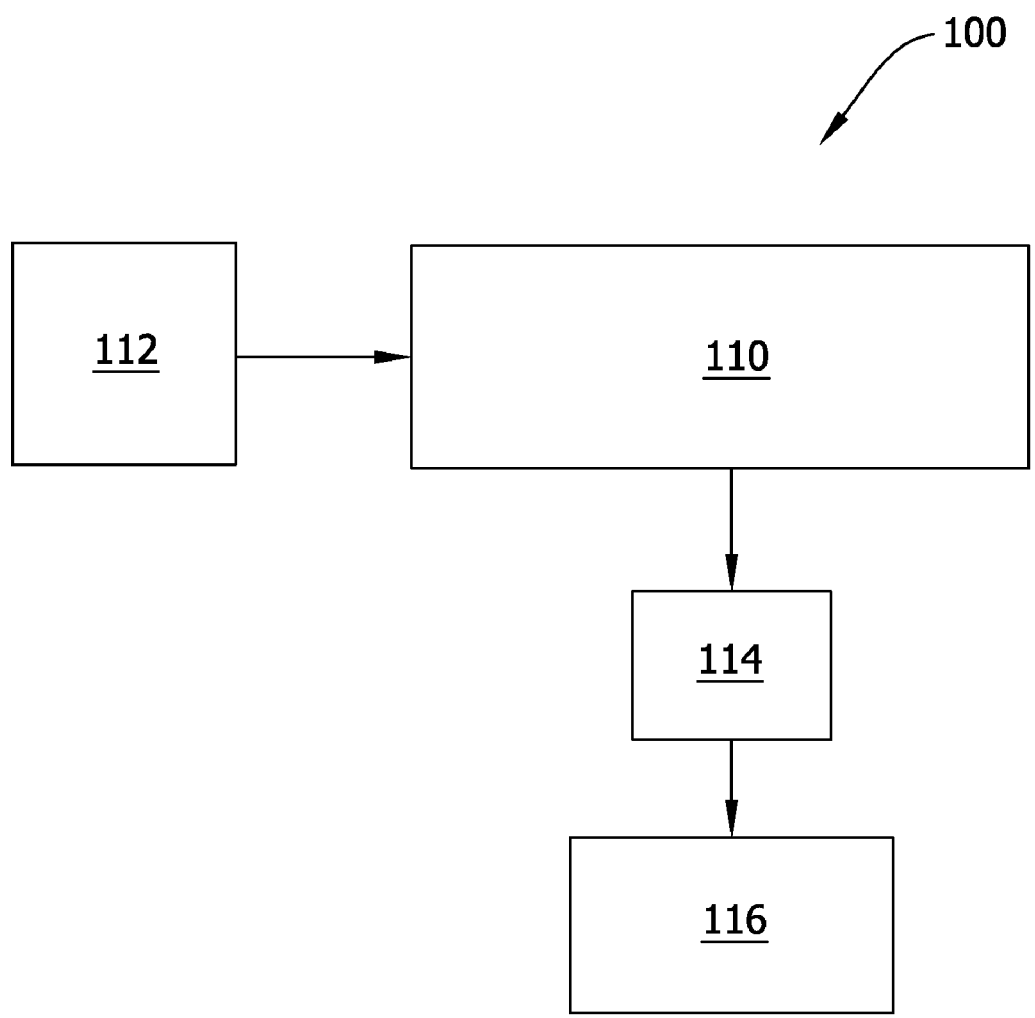
FIG. 1 is a block diagram of an exemplary flight control system.

FIG. 1 is a block diagram of an exemplary flight control system 100. In the exemplary embodiment, flight control system 100 includes a flight controller 110, a sensor 112, an input/output (I/O) device 114, and an actuator 116. Sensor 112 provides flight controller 110 with data, for example, current flight information, aircraft information, and weather-related information. Flight controller 110 receives and processes the data, resulting in flight control instructions provided to I/O device 114, and to actuator 116 where action is taken in accordance with flight control instructions. Although illustrated as including a single sensor 112, a single I/O device 114, and a single actuator 116, system 100 may include any number of sensors, I/O devices, and actuators that allow system 100 to function as described herein.

In a specific embodiment, when an operator moves an input device (not shown in FIG. 1) coupled to sensor 112, sensor 112 transfers the operator input to flight controller 110. For example, an operator's movement of a flight stick (not shown in FIG. 1) are received by sensor 112 and transferred to flight controller 110. Controller 110 determines the operations of flight control surfaces of the aircraft (not shown in FIG. 1) that correspond to the operator input. Controller 110 may also combine the operator input with any other sensor inputs pre-programmed to correspond to the selected operator input, for example, weather-related inputs, altitude input and/or aircraft speed input. In other embodiments, controller 110 does not receive an operator input, but rather determines the operations of flight control surfaces of the aircraft based on, for example, a pre-programmed flight plan and inputs from sensor 112. Actuators 116 move the flight control surfaces of the aircraft according to flight controller 110 instructions.

Figure 2:
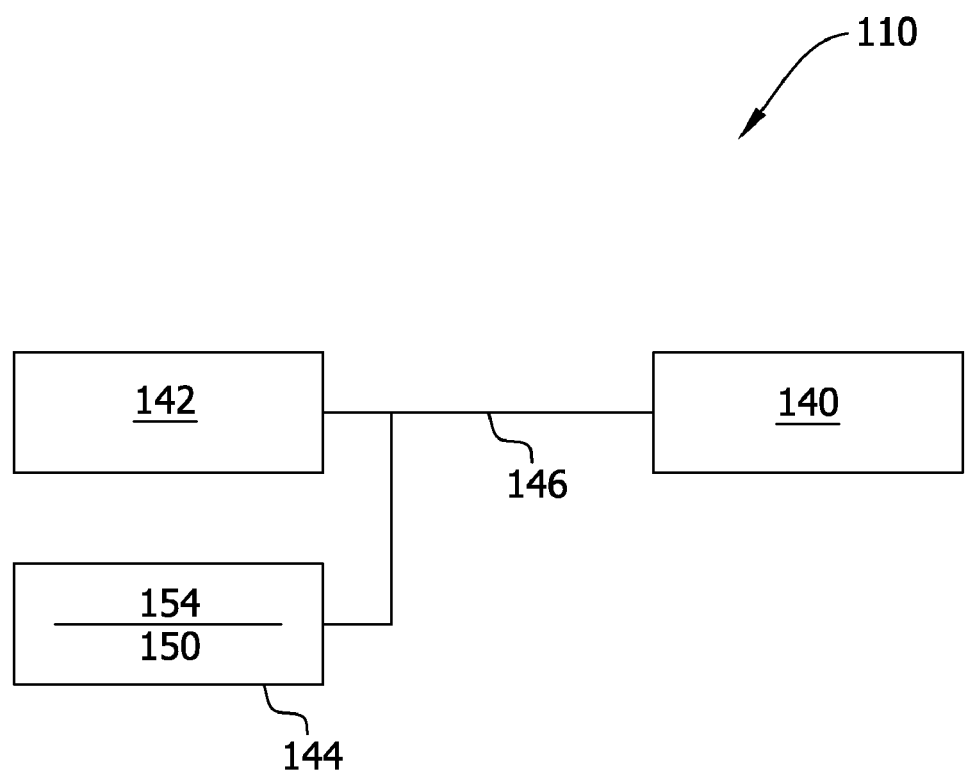
FIG. 2 is a block diagram of an exemplary embodiment of a flight controller.

FIG. 2 is a block diagram of an exemplary embodiment of flight controller 110. In the exemplary embodiment, flight controller 110 includes a processor 140, a read only memory (ROM) device 142, and a random access memory (RAM) device 144. In the exemplary embodiment, ROM memory device 142, RAM memory device 144, and processor 140 are coupled by a memory bus 146. In some examples, ROM memory device 142 is a Flash memory device, however, ROM memory device 142 may be any memory device that allows flight controller 110 to function as described herein. The above memory types are exemplary only, and are thus not limiting as to the types of memory usable within flight controller 110.

At least one of ROM device 142 and RAM device 144 store, and processor 140 executes, at least one executable program. In the exemplary embodiment, the executable program includes an operating system and at least one application. The operating system controls allocation of the resources of system 100 (shown in FIG. 1) and applications control, for example, operation of the aircraft. The operating system includes executable code and data structures used to implement the resource allocation services of the operating system. The applications include executable code and data structures used to, for example, determine flight instructions. In certain embodiments, the operating system is a real time operating system (RTOS). The RTOS facilitates deterministic behavior, where responses to events are expected to occur within a predetermined period of time after the occurrence of the event. The RTOS may be stored on ROM memory device 142 and/or RAM memory device 144, and is accessible to processor 140 over memory bus 146.

RAM memory device 144 includes one continuous bank of RAM. The one continuous bank of RAM includes a first sector on the low address space where executable programs are copied to and where they execute from. The first sector of RAM is referred to herein as a low-RAM 150. The one continuous bank of RAM also includes a second sector on the high address space where programs are placed in transient status. The second sector of RAM is referred to herein as a high-RAM 154. The programs are copied to high-RAM 154 and low-RAM 150 from either ROM device 142 or from a target host system (not shown in FIG. 2). Upon the occurrence of an event and/or fault, programs are copied from high-RAM 154 to low-RAM 150 and executed from low-RAM 150. In the exemplary embodiment, processor 140 controls read/write operations between ROM device 142, low-RAM 150, and high-RAM 154.

Figure 3:
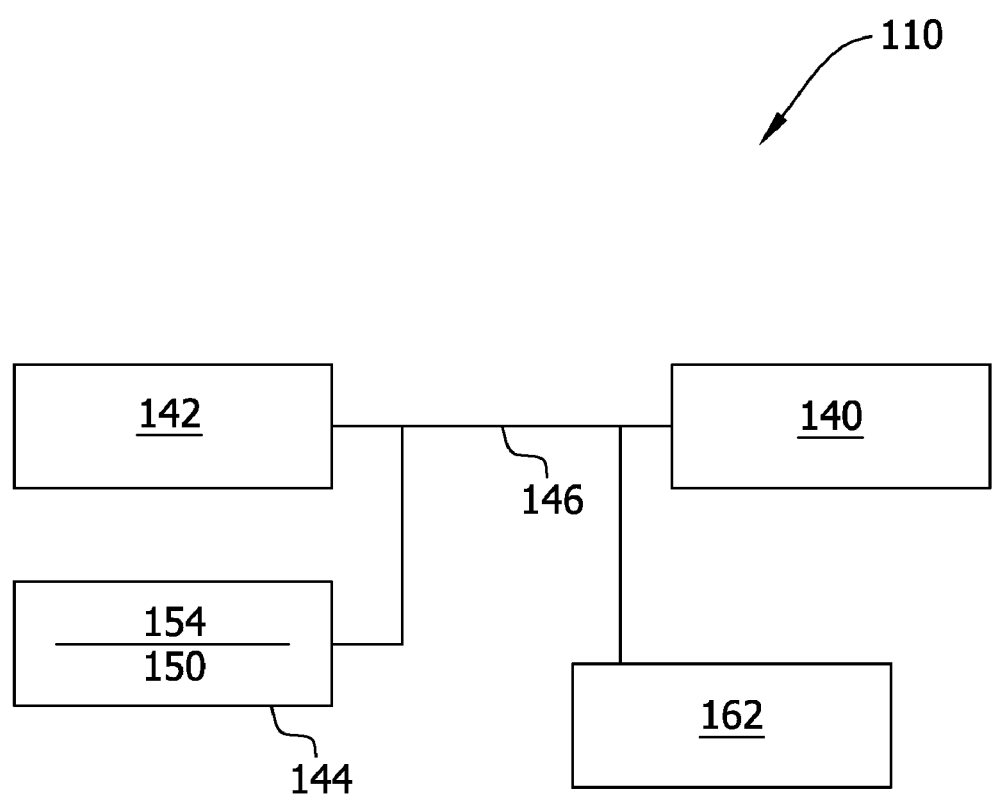
FIG. 3 is an alternative embodiment of the flight controller shown in FIG. 2.

FIG. 3 is an alternative embodiment of flight controller 110. Components shared between the exemplary embodiment of flight controller 110 (shown in FIG. 2) and the alternative embodiment of flight controller 110 (shown in FIG. 3) are identified with identical reference numerals. In the alternative embodiment, flight controller 110 includes a direct memory access (DMA) engine 162. DMA engine 162 performs read/write operations between ROM device 142, low-RAM 150, and high-RAM 154 independently of processor 140. DMA engine 162 facilitates rapid transfer of data between memory devices 142 and 144, unburdening processor 140 of these data transfer tasks.

Figure 4:
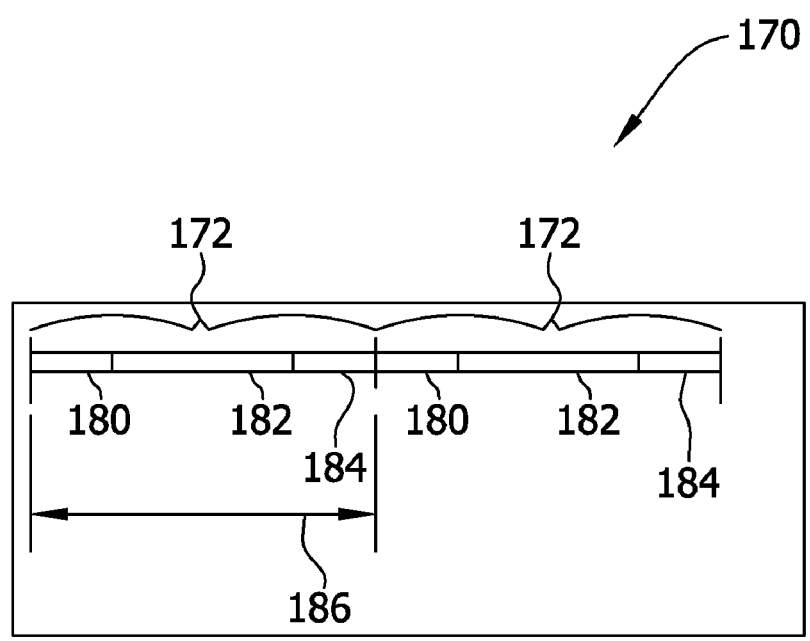
FIG. 4 is an exemplary timing diagram of operations of a flight control system.

FIG. 4 is an exemplary timing diagram 170 of flight controller 110 operation. Timing diagram 170 illustrates a control loop 172 of flight controller 110 operations that are repeated, to continuously determine the operating instructions that maintain the operation of the aircraft. Flight controller 110 operations include obtaining 180 inputs, processing 182 the inputs, and sending 184 outputs. In the exemplary embodiment, flight controller 110 obtains 180 inputs from, for example, sensor 112 (shown in FIG. 1), and sends 184 outputs to, for example, I/O device 114 (shown in FIG. 1), which in turn effects operation of actuator 116 (shown in FIG. 1). The length of control loop 172 is referred to herein as a computing frame 186. Computing frame 186 is dependent upon flight control requirements. For example, a large passenger aircraft may not demand flight control signals to maintain stability as frequently as a fighter jet. In some embodiments, for example a fighter jet, the operations 180, 182, and 184 may be performed in less than one millisecond (ms). In some embodiments, for example, a passenger aircraft, computing frame 186 may be from one ms to five-hundred ms in length, however, these computing frames 186 are given as examples only, and are not meant to be limiting.

Any interruptions in control loop 172 may interrupt operation of flight control system 100. Reducing the effect of interruptions in control loop 172 facilitates reducing interruptions to operation of flight control system 100. For example, a software error may interrupt operation of processor 140 and therefore control loop 172. The software error may be, for example, an event such as a divide-by-zero error, a data access exception, or an instruction access exception in the executable program running on processor 140. The software error may be any event that interrupts operation of processor 140 and therefore interrupts control loop 172. A restart of processor 140 typically will return processor 140 to normal operation by eliminating a software error. However, during a processor reset, control loop 172 is interrupted. The shorter the length of computing frame 186, the greater the affect of an error event on flight controller 110, due to more frames 186 of control loop 172 passing while processor 140 is returning to normal operation.

Figure 5:
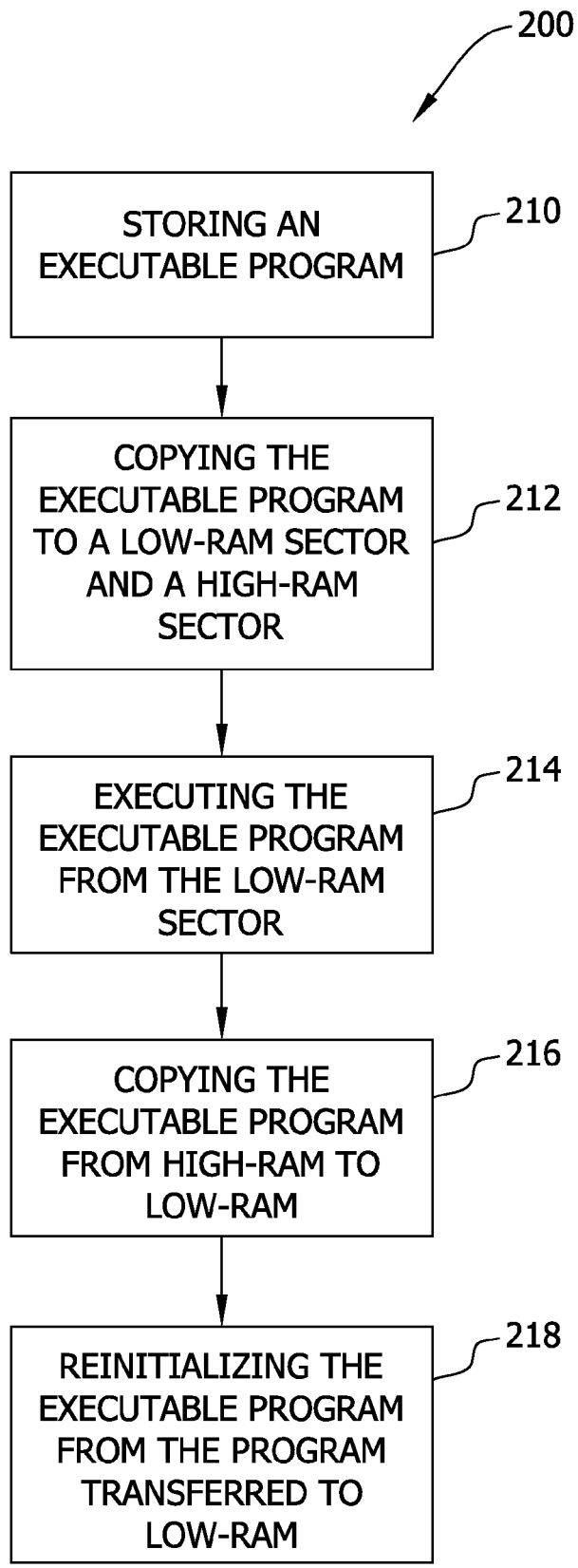
FIG. 5 is a flowchart of an exemplary method for rapid restarting of a flight control system.

FIG. 5 is a flowchart 200 of an exemplary method for rapid restarting of a flight control system, for example, flight control system 100 (shown in FIG. 1). The exemplary method includes storing 210 an executable program in, for example, ROM device 142 (shown in FIG. 2). The executable program includes program text and read only data. More specifically, in the exemplary embodiment, the executable program includes an operating system code and application code. The method also includes copying 212 the executable program during startup of flight controller 110 (shown in FIG. 1). Copying 212 the executable program during flight controller startup includes copying the executable program stored in ROM device 142 to a low-RAM and also to a high-RAM. For example, the executable program is copied to low-RAM 150 of RAM memory device 144 (shown in FIG. 2), and also copied to high-RAM 154 of RAM memory device 144 (shown in FIG. 2).

Once copied 212 to low-RAM and to high-RAM, a processor executes 214 the executable program from low-RAM 150. As described above, an event, for example, a software error or fault, may be resolved by restarting processor 140. Restarting processor 140 includes reinitializing the executable program to eliminate the processor error or fault. The exemplary method includes copying 216 the executable program from high-RAM 154 to low-RAM 150 and reinitializing 218 processor 140 using the executable program transferred to low-RAM 150. Reinitializing 218 processor 140 using the copied executable program facilitates restarting processor 140 with the original executable program, free of errors that may have entered the executable program during execution before the processor error or fault.

In some embodiments, a full restart of processor 140 is not needed and certain steps in the restart process can be eliminated when restarting processor 140 after the occurrence of a software error/fault. For example, if not needed to overcome the software error/fault, setup of the memory management unit (MMU) may be skipped. The rapid transfer of the executable program between high-RAM 154 and low-RAM 150 facilitates reducing the restart time of processor 140. Furthermore, a reduced restart time facilitates reducing interruption of processor 140 (shown in FIG. 2) operation which may reduce a period of time that control loop 172 (shown in FIG. 4) is not cycling through operations. Since interrupting control loop 172 may interrupt flight control, a rapid restart of processor 140 is advantageous.

In the exemplary embodiment, copying 212 is controlled by processor 140 using read/write commands. In an alternative embodiment, copying 212 is controlled independently of processor 140 by, for example, DMA engine 162 (shown in FIG. 3). Controlling copying 212 independently from processor 140 facilitates reducing the load on processor 140 as well as decreasing executable program transfer times.

Described herein are exemplary methods and systems for rapid restarting of a flight control system. More specifically, the method described herein can be utilized to store and access an executable program from a section of RAM in the event of a software fault/error.

The systems and methods described herein facilitate efficient and economical operation of a flight control system. Facilitating a reduction in a processor restart time may facilitate reducing the effects of a software error on aircraft operation. A technical effect of the methods and systems described herein includes facilitating reduced restart times of a flight control system processor.

Although the systems and methods described and/or illustrated herein are described and/or illustrated with respect to aircraft and flight control systems, practice of the systems and methods described and/or illustrated herein is not limited to aircraft or flight control systems. Rather, the systems and methods described and/or illustrated herein are applicable to any plant or vehicle where uninterrupted operation is desirable.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for rapid restarting of a flight control system, wherein the flight control system comprises a processor, said method comprising:

storing at least one executable program on a non-volatile memory device;

copying the at least one executable program to a first random access memory (RAM) sector and a second RAM sector of a RAM memory device at a predetermined time, wherein the first RAM sector is a low-RAM sector on a continuous bank of RAM memory and the second RAM sector is a high-RAM sector on the continuous bank of RAM;

executing, using the processor, the at least one executable program from the first RAM sector;

restarting the processor upon occurrence of an event;

copying the at least one executable program from the second RAM sector to the first RAM sector; and reinitializing processor operation by executing the at least one executable program copied to the first RAM sector.

2. A method in accordance with claim 1, wherein copying the at least one executable program is controlled by at least one of a direct memory access (DMA) engine and the processor.

3. A method in accordance with claim 1, wherein copying the at least one executable program at a predetermined time comprises copying the at least one executable program during startup of the flight control system.

4. A method in accordance with claim 1, wherein storing at least one executable program comprises storing a real time operating system (RTOS) on the memory device.

5. A method in accordance with claim 1, wherein copying the at least one executable program from the second RAM sector to the first RAM sector comprises copying the at least one executable program after the occurrence of a processor software fault/error.

6. A flight control system comprising:

at least one sensor configured to collect data;

a flight controller coupled to said at least one sensor, said flight controller comprising:

a random access memory (RAM) device configured to store at least one executable program in a first RAM sector and a second RAM sector of said RAM device wherein the first RAM sector is a low-RAM sector on a continuous bank of RAM memory and the second RAM sector is a high-RAM sector on the continuous bank of RAM;

a processor configured to execute the at least one executable program from the first RAM sector to process the sensor data, and to output operational instructions, said processor further configured to control transfer of the at least one executable program from the second RAM sector to the first RAM sector during a processor reset and to reinitialize using the executable program transferred to the first RAM sector to resolve a processor fault/error; and at least one actuator coupled to said flight controller, said actuator configured to receive and execute the operational instructions.

7. A flight control system in accordance with claim 6, wherein said at least one sensor further comprises an input device configured to receive inputs provided by an operator of the flight control system.

8. A flight control system in accordance with claim 6, wherein said at least one sensor/input device, said flight controller, and said at least one actuator are coupled over a memory bus.

9. A flight control system in accordance with claim 6 further comprising a read only memory (ROM) device configured to store the at least one executable program.

10. A flight control system in accordance with claim 9, wherein said processor is further configured to control transfer of the at least one executable program from the ROM device to the RAM device at a predetermined time.

11. A flight control system in accordance with claim 10, wherein said predetermined time is at a startup of said flight controller.

12. A flight control system in accordance with claim 6, wherein said flight controller further comprises a direct memory access (DMA) engine configured to:
control transfer of the at least one executable program from the ROM device to the RAM device at startup of said flight controller, and
control transfer of the at least one executable program from the second RAM sector to the first RAM sector after a processor fault/error.

13. A flight controller comprising:
a random access memory (RAM) device comprising a first RAM sector and a second RAM sector, wherein a first copy of at least one executable program is stored in the first RAM sector, and a second copy of the at least one executable program is stored in the second RAM sector, wherein the first RAM sector is a low-RAM sector on a continuous bank of RAM memory and the second RAM sector is a high-RAM sector on the continuous bank of RAM; and
a processor coupled to said RAM device and configured to:
execute the at least one executable program from the first RAM sector;
control transfer of the at least one executable program from the second RAM sector to the first RAM sector during a processor reset; and
reinitialize using the executable program transferred to the first RAM sector to resolve a processor fault/error.

14. A flight controller in accordance with claim 13, further comprising a read only memory (ROM) device configured to store the at least one executable program.

15. A flight controller in accordance with claim 14, wherein said processor is further configured to control transfer of the at least one executable program from the ROM device to the first RAM sector and to the second RAM sector of the RAM device at a predetermined time.

16. A flight controller in accordance with claim 15, wherein the predetermined time is at a startup of said flight controller.

17. A flight controller in accordance with claim 15 further comprising a direct memory access (DMA) engine configured to control transfer of at least one of:
the at least one executable program from the second RAM sector to the first RAM sector after a processor fault/error; and
the at least one executable program from the ROM device to the RAM device at startup of said flight controller.

18. A method in accordance with claim 1, wherein the event includes a software error and/or fault.

19. A method in accordance with claim 1, further comprising maintaining the at least one executable program unchanged within the second RAM sector of the RAM memory device.

* * * * *